United States Patent [19]
VanDeMotter et al.

[11] Patent Number: 5,303,986
[45] Date of Patent: Apr. 19, 1994

[54] ELECTROPNEUMATIC BRAKE CONTROL WITH RETARDER APPORTIONING

[75] Inventors: Patrick J. VanDeMotter, North Olmsted, Ohio; Edward G. Shaw, Portishead, England

[73] Assignees: Allied-Signal Inc., Morristown, N.J.; Bendix Limited, Bristol, England

[21] Appl. No.: 12,075

[22] Filed: Feb. 1, 1993

[51] Int. Cl.$^5$ .......................... B60T 13/74; B60T 8/18
[52] U.S. Cl. ......................................... 303/3; 303/15; 303/22.1
[58] Field of Search ...................... 303/3, 7, 9.61, 9.69, 303/15–17, 20, 22.1, 95, 103, DIG. 1–4; 188/180, 182; 364/426.01, 426.02

[56] References Cited

U.S. PATENT DOCUMENTS

| 4,550,372 | 10/1985 | Kahrs | 303/3 X |
| 4,749,238 | 7/1988 | Singleton et al. | 303/15 |
| 4,787,683 | 11/1988 | Singleton | 303/110 |
| 4,804,234 | 2/1989 | Gee et al. | 303/7 |
| 5,050,936 | 9/1991 | Tanaka et al. | 303/3 |
| 5,086,865 | 2/1992 | Tanaka et al. | 180/165 |
| 5,184,875 | 2/1993 | Wrede | 303/3 |

Primary Examiner—Robert J. Oberleitner
Assistant Examiner—Josie A. Ballato
Attorney, Agent, or Firm—Ken C. Decker; W. N. Antonis

[57] ABSTRACT

A fluid pressure braking system for a vehicle equipped with a drive line retarder automatically reduces the braking pressure level communicated to the brakes controlling the driven wheels of the vehicle to adjust for the retardation effected by the retarder. The retarder is actuated automatically each time the brake is applied by calculating the appropriate retardation level as a function of the brake pressure being demanded by the vehicle operator and by the load carried by the vehicle.

18 Claims, 9 Drawing Sheets

ELECTROPNEUMATIC BRAKE CONTROL WITH RETARDER APPORTIONING

This invention relates to an integrated braking system for a heavy duty vehicle equipped with both an electropneumatic braking system and a retarder.

Many heavy duty vehicles are equipped with both a pneumatic braking system and an operator controlled vehicle retarder that applies a retarding torque to the vehicle driveline. On existing vehicles, the retarder is used to retard the vehicle on long downhill grades and is rarely used otherwise. Retarders are generally not used when the normal pneumatic braking system is used, because braking on the driven wheels is never balanced with the braking on the front wheels if the retarder is used during operation of the pneumatic braking system, and because the operator must operate a hand control, requiring that the operator remove a hand from the steering wheel.

Integration of the retarder control system with the control system for the pneumatically actuated brakes according to the present invention distributes the braking level required by the vehicle operation between the systems without jeopardizing braking balance front-to-rear of the vehicle. Although retarders in use today are controlled by switches operated by the vehicle operator, the retarder is activated automatically when the brake treadle is operated according to the present invention. Accordingly, the retarder is actuated every time the electropneumatic braking system is actuated (unless the vehicle speed drops below a predetermined threshold, or until intervention of the adaptive braking system is initiated) resulting in considerable savings in brake lining wear, while maintaining the requested braking level and balance.

The present invention is useful with all types of retarders in common use today. Staged retarders usually provide four discrete stages or levels of retardation which are under the control of the vehicle operator by operating switches controlling the retarders. A variable retarder is similar to a stage retarder, but is continuously variable over a predetermined range rather than being actuatable in discrete stages. Engine brakes and exhaust brakes also provide vehicle retardation.

These and other advantages of the present invention will become apparent from the following description, with reference to the accompanying drawings, in which.

Figure 1:
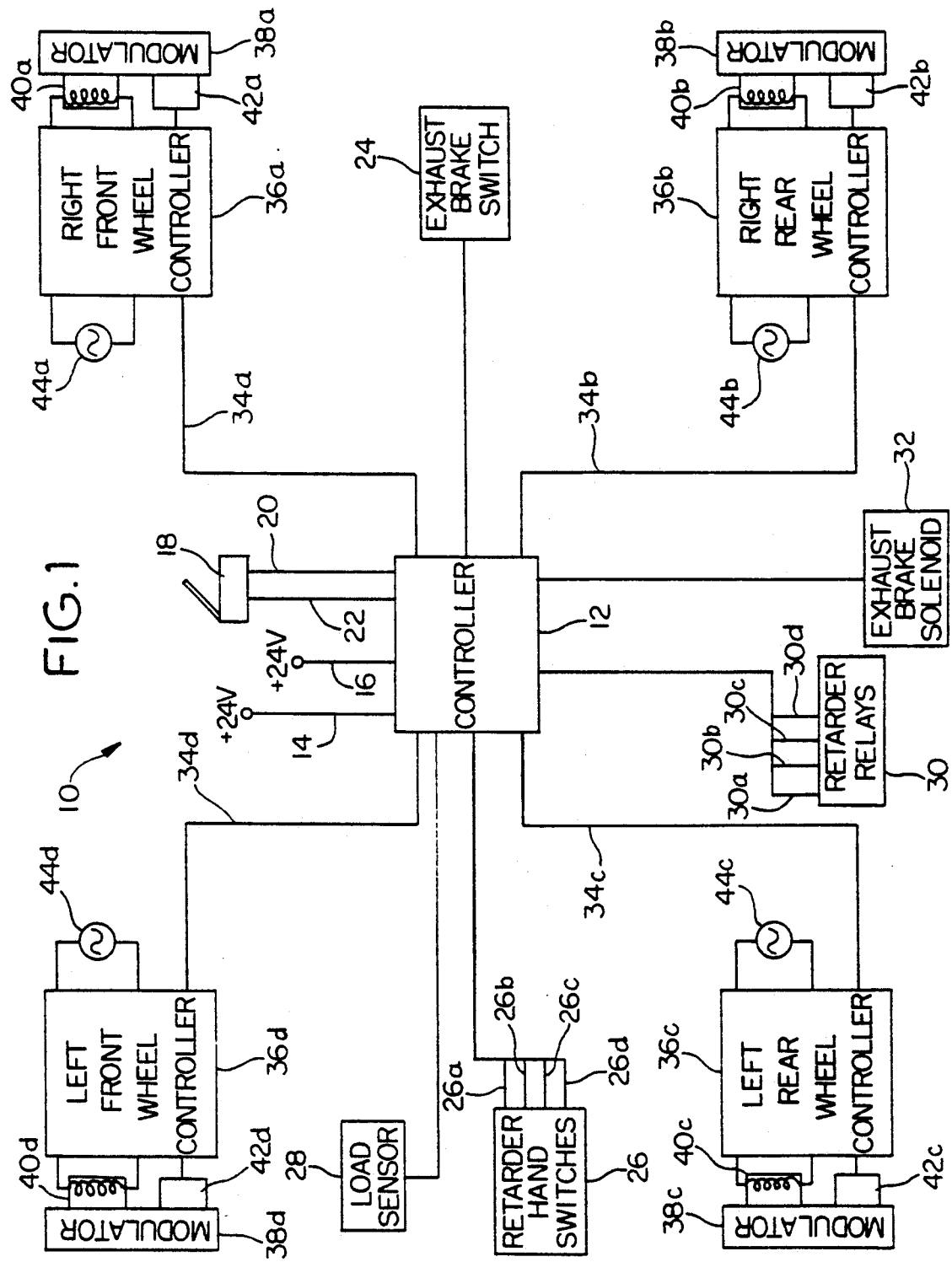
FIG. 1 is an overall system schematic of an electropneumatic braking system with an integrated retarder control made pursuant to the teachings of the present invention.

Referring now to the drawings, an electropneumatic braking system with integrated retarder control generally indicated by the numeral 10 includes a central or master controller 12 which, for redundancy, preferably receives power from each of two 24 volt sources 14 and 16 if the vehicle is equipped with a 24 volt system, or from 12 volt sources if equipped with a 12 volt system. A brake treadle signal generator generally indicated by the numeral 18 is mounted in the operator's compartment of the vehicle and is actuated by the vehicle operator to effect braking. Preferably, the signal generator 18, for redundancy, simultaneously generates two independent signals, which are transmitted over independent lines 20, 22 to the controller 12. Each of the signals vary in accordance with the distance the driver has depressed the brake treadle.

The central or master controller 12 also receives an input signal from an engine or exhaust brake switch (or both) 24, which is actuated when the operator wishes to actuate the vehicle engine and/or exhaust brake. Controller 12 also receives input signals from the retarder hand switches 26. If a four-stage retarder is used, four separate switches 26a, 26b, 26c and 26d are actuated to activate each of the increasingly retarding stages of the retarder. The retarder hand switches 26 are mounted in the vehicle operator's compartment for operation by the vehicle operator. Controller 12 further receives a signal from vehicle load sensor 28, which generates a signal which varies in accordance with the load carried by the vehicle. For example, the load sensor 28 may be a pressure sensor which generates a signal which varies in accordance with the pressure in the vehicle airbag suspension if the vehicle is equipped with an air suspension system, or the load sensor 28 may generate a signal which varies in accordance with the deflection of the vehicle suspension system caused by increasing vehicle load. In either case, the load sensor 28 is conventional.

The controller 12 also generates output signals which are transmitted to the retarder relays generally indicated by the numeral 30. If a four stage retarder is used, four separate connections 30a, 30b, 30c and 30d are connected to four separate relay actuators which actuate the four increasingly retarding stages of the retarder. Controller 12 also generates an output signal which may be transmitted to an exhaust brake actuating solenoid 32, which actuates the exhaust brake. In addition to, or instead of, an exhaust brake solenoid, an engine brake, which is also solenoid actuated, may be used.

The controller 12 is also connected by data transmission lines 34a, 34b, 34c and 34d to a right front wheel controller 36a, a right rear wheel controller 36b, a left rear wheel controller 36c, and a left front wheel controller 36d. Each of the controllers 36a-d includes a brake pressure modulator 38a, 38b, 38c and 38d, each of which includes a coil 40a, 40b, 40c and 40d which is actuated by the corresponding controller in accordance with signals transmitted from the master controller 12. Each of the controllers 36a-d includes a brake pressure sensor 42a, 42b, 42c and 42d, which measures the braking pressure. The sensors 42a-d transmit a signal representing the braking pressure to the left front wheel controller, which in turn transmits this information to the master controller 12 through the data transmission lines 34a-d. Each of the controller 36a-d further includes wheel speed sensors 44a, 44b, 44c and 44d, each of which generates a signal representing the wheel speed of the wheel controlled by the corresponding controller 36a-d. This wheel speed signal is transmitted to the controller 12 through the data transmission lines 34a-d.

In the following discussion, it will be assumed that the front wheels of the vehicle are the non-driven wheels, and that the rear wheels are the driven wheels. Since the retarders and/or exhaust and engine brake apply a retarding torque to the drive train, only the rear wheel is affected by the retarder. According to the present invention, one or more stages of the retarder is switched on every time that a brake application is effected that requests a braking level at least equal to that provided by the lowest retarder stage (assuming that the vehicle is traveling above a predetermined minimum speed and that an incipient skidding condition does not exist). The pressure level transmitted to the rear wheel brakes is adjusted for the effects of the retarders so that braking balance front to rear is maintained. The extent of braking is controlled by the vehicle operator through operation of the treadle 18. When the treadle 18 is depressed, a signal requesting a predetermined brake pressure level is sent directly to the front wheel controls 36a and 36d. Pressure level in the brakes controlling the front wheels is then established in the manner set forth in co-pending U.S. patent application Ser. No. 7/894,386. The braking pressure requested in the rear wheel brakes, however, is adjusted depending upon the retardation level that has been set, either by the hand switches 26, or automatically as will hereinafter be described upon actuation of the brake treadle 18. Any additional braking required to achieve a balance front to rear is generated by communicating an appropriate pneumatic pressure level to the rear wheel brake actuators. This is done by transmitting an electronic brake pressure request signal through the data transmission lines 34b, 34c to the rear wheel controllers 36b and 36c. The pressure in the rear wheel brakes is then established as set forth in the aforementioned U.S. patent application 7/849,386.

Figure 2:
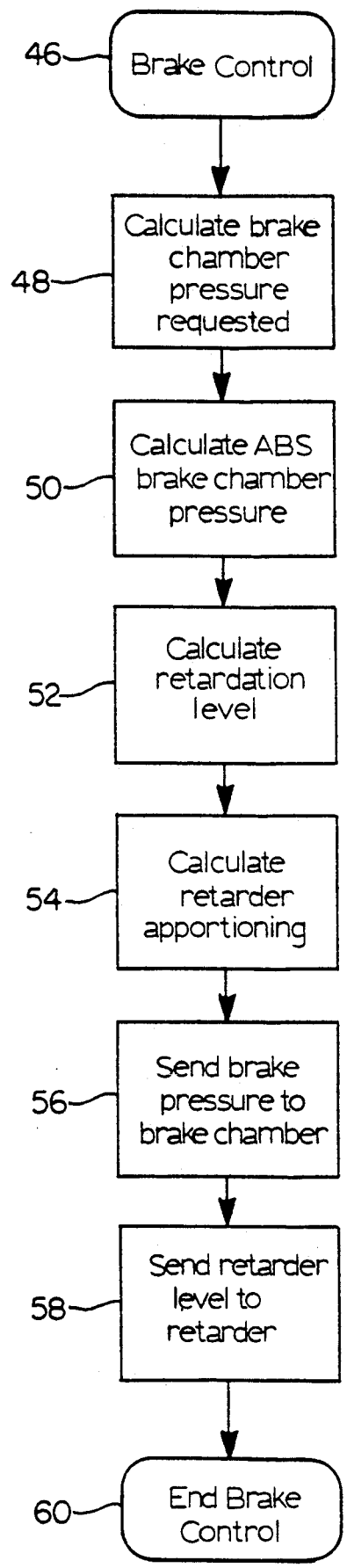
FIGS. 2, 3, 5a, 5b and 6-8 are schematic logic diagrams illustrating the manner in which the system according to the present invention controls braking pressure and actuation of the drive line retarders.

Referring now to FIG. 2, the following routine for brake control generally indicated by the numeral 46 is illustrated. The routine first calculates that brake chamber pressure requested by the vehicle operator, as indicated at 48. This is preferably done by merely scaling the inputs received from the brake treadle signal generator and then choosing one of the two inputs (generally the higher input). As discussed above, the controller 12 includes an algorithm for antiskid control. Accordingly, as indicated at 50, if the pressure requested by the vehicle operator is so high that one of the wheels is about to lock up, the adaptive braking subroutine is called to calculate a brake pressure which will effect a brake application just below lock up pressure. Since the adaptive braking system forms no part of the present invention, and any one of a number of such routines may be used, the routine will not be illustrated in detail. The retardation level is then calculated, as illustrated at 52. This is done according to the subroutine illustrated in FIGS. 5a and 5b hereof, which will be described in detail hereinafter. The program then calculates the retarder apportioning to determine the brake pressures that should be sent to the brakes controlling each of the wheels of the driven axle, as indicated at 54 in FIG. 2. This subroutine will be explained in detail hereinafter with reference to FIG. 3. The program then, as indicated at 56, sends the desired brake pressure as determined by the subroutine calculating the retarder apportioning as indicated at 54 to the controllers 36b and 36c controlling the driven wheels of the vehicle. It will be remembered that the braking pressure controlling the wheels on the non-driven axle (controllers 36a and 36d) are the scaled braking pressure, as modified by the adaptive braking routine if necessary. The calculated retarder level is then used to set the retardation level, as indicated at 58. As will be explained hereinafter, the vehicle operator is allowed to override the retardation level set by the program by controlling the hand switches 26a-d to thereby manually set the retardation level. The brake control then ends and returns as indicated at 60.

Figure 3:
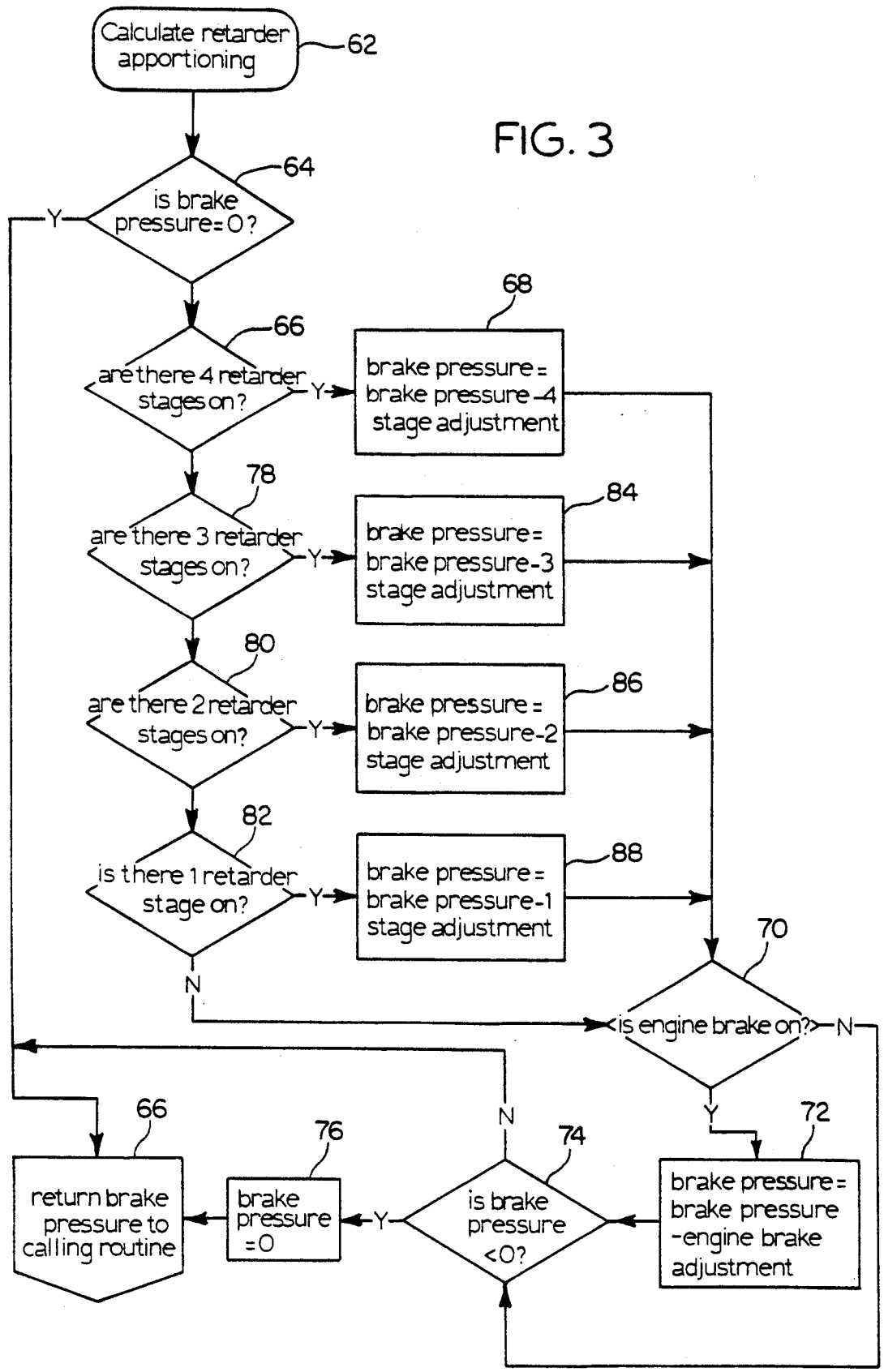
Figure 4:
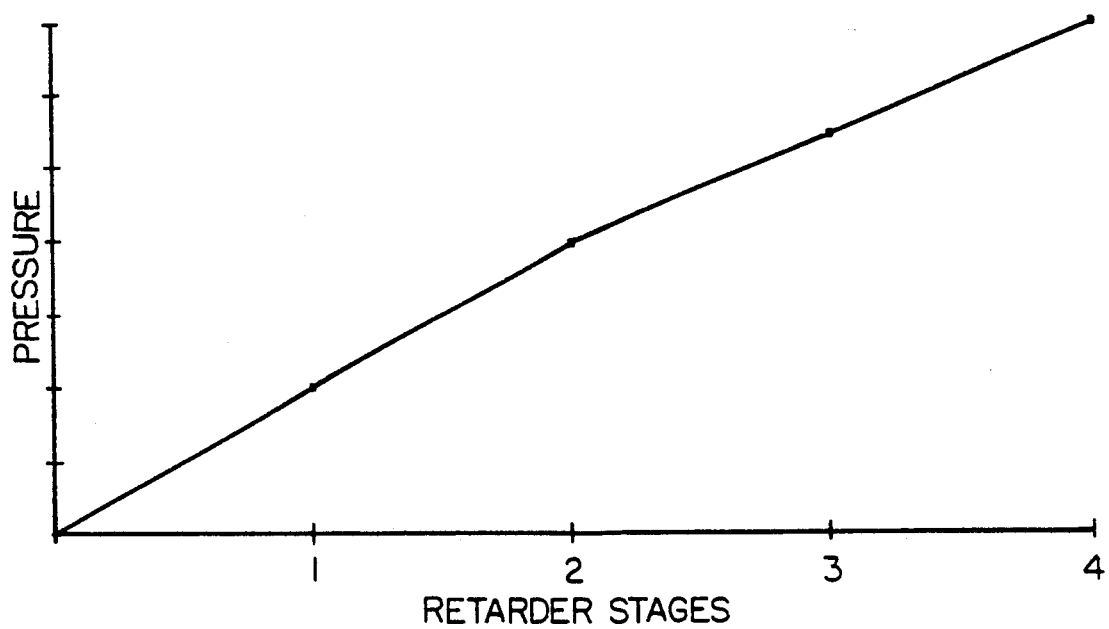
FIG. 4 is graphical representation of the relationship between the retarder stage and the equivalent braking pressure.

Referring now to FIG. 3, the subroutine called at 54 in FIG. 2 to calculate the retarder apportioning to determine the brake pressure that is to be sent to the brake chambers of the brakes controlling the driven wheels will now be described in detail. Referring to FIG. 3, the retarder apportioning subroutine indicated at 62 is called at 54 in the program illustrated in FIG. 2. As indicated at 64, the brake pressure requested by the vehicle operator is tested to determine if a brake pressure higher than zero is being requested. If a zero brake pressure is being requested, the program immediately returns a zero brake pressure to the calling routine, as indicated at 66. If a braking pressure higher than a zero braking pressure is being requested, the program then determines if there are four retarder stages on, as indicated at 66. The number of retarder stages turned on is determined as will hereinafter be described with respect to FIGS. 5-7. If there are four retarder stages on, the braking pressure request is set equal to that requested by the vehicle operator by operation of the treadle 18 minus a four stage retarder adjustment, as indicated at 68 in FIG. 3. The retarder stage adjustment is determined empirically and is plotted graphically as illustrated in FIG. 4. The adjustment for each retarder stage is determined by measuring vehicle deceleration on a flat surface with a uniform coefficient friction. This data is collected and plotted in graphical form as illustrated in FIG. 4. The data can be used in the program controlling braking by storing the data for each retarder stage in memory.

The difference between the brake pressure requested by the vehicle and the four stage adjustment as calculated at 68 is then further adjusted, as indicated at 70, for the effect of the engine and/or exhaust brake. According to the present invention, the engine and/or exhaust brake can only be set manually, but it is possible to set the engine brake automatically by the same manner as the retarder stages are set automatically as will be discussed hereinafter. If the engine brake is on, the engine brake adjustment, which is determined the same way of the retarder stage adjustment, is subtracted from the brake pressure request, as indicated at 72. The result is then tested, as indicated at 74, to determine if this braking pressure is greater than zero. If the engine brake is off, the results of the adjustment for the retarder effect is sent directly to decision block 74. If the brake pressure is less than zero, the pressure is set equal to zero, as indicated at 76, then a return to the calling routine is indicated at 66. If pressure is greater than zero, the pressure is sent directly to the calling routine. It is possible for the requested calculated brake pressure, after adjusting for retardation, to be less than zero, either because of the fact that the retardation level has been sent manually, or because of the fact, as will hereinafter be described, the setting of the retardation level automatically takes factors, such as vehicle load, into account other than the brake pressure being requested by the vehicle operator.

If there are three, two, or one retarder stages on, as tested for at 78, 80 and 82, the corresponding adjustment for the third stage, second stage, or first stage retardation is made, as indicated at 84, 86 and 88 in FIG. 3. In any case, after this pressure is calculated at 68, 84, 86 or 88 is adjusted for the effect of the engine brake, the requested brake pressure is then sent back to the calling routine, where it is set to the corresponding brake chambers, as indicated at 56 in FIG. 2. The controllers 36b and 36c then effect a brake application in accordance with the pressure level requested.

The manner in which the retardation level is set automatically when a vehicle operator effects a brake pressure request by operating the treadle 18 will now be described in detail with reference to FIGS. 5a and 5b. The retarder control subroutine is started as indicated at 79, and then proceeds to determine whether or not the vehicle velocity reference is less than a predetermined minimum retarder vehicle speed, as indicated at 81. Vehicle velocity reference may be determined, for example, by averaging the speed set by the speed sensors 48a and 44d of the non-driven wheels of the vehicle. The minimum retarder speed is a relatively low speed set arbitrarily at a speed at which it is desirable that the retarders not operate, since retarders are not efficient at low vehicle speeds. If the vehicle velocity reference is less than the retarder vehicle speed reference, the retarder level is set at a zero retarder level, as indicated at 83. The program then returns this retarder level of zero to the calling routine. If the vehicle reference is above the minimum vehicle speed reference, the program then tests, as indicated at 85, as to whether the load being sensed by the load sensor 28 is less than a predetermined minimum load count. The load sensor 28 generates a load count that increases and decreases as the load carried by the vehicle is increased or decreased, after a predetermined offset. If the load sensor output is less than the minimum load count, the variable load sensor is set equal to the minimum load count, as indicated at 87. The program then proceeds to test whether or not the load sensor is greater than maximum load count, as indicated at 89. If the load sensor is greater than the maximum permitted load sensor count, the variable load sensor is set equal to the maximum load count, as indicated at 90. If the load count is between the minimum and maximum levels, step function is then calculated, as indicated at 92, as being equal to the load sensor offset plus load sensor slope times load sensor count, all divided by 100. The retarder stage is then set equal to the predetermined retarder threshold constant plus the step function calculated at 92, as indicated at 94. The retarder stage is a pressure that is equivalent to the pressure request generated by the brake treadle signal generator 18. The program then proceeds to the circle labeled 1 in FIG. 5b.

Figure 5A:
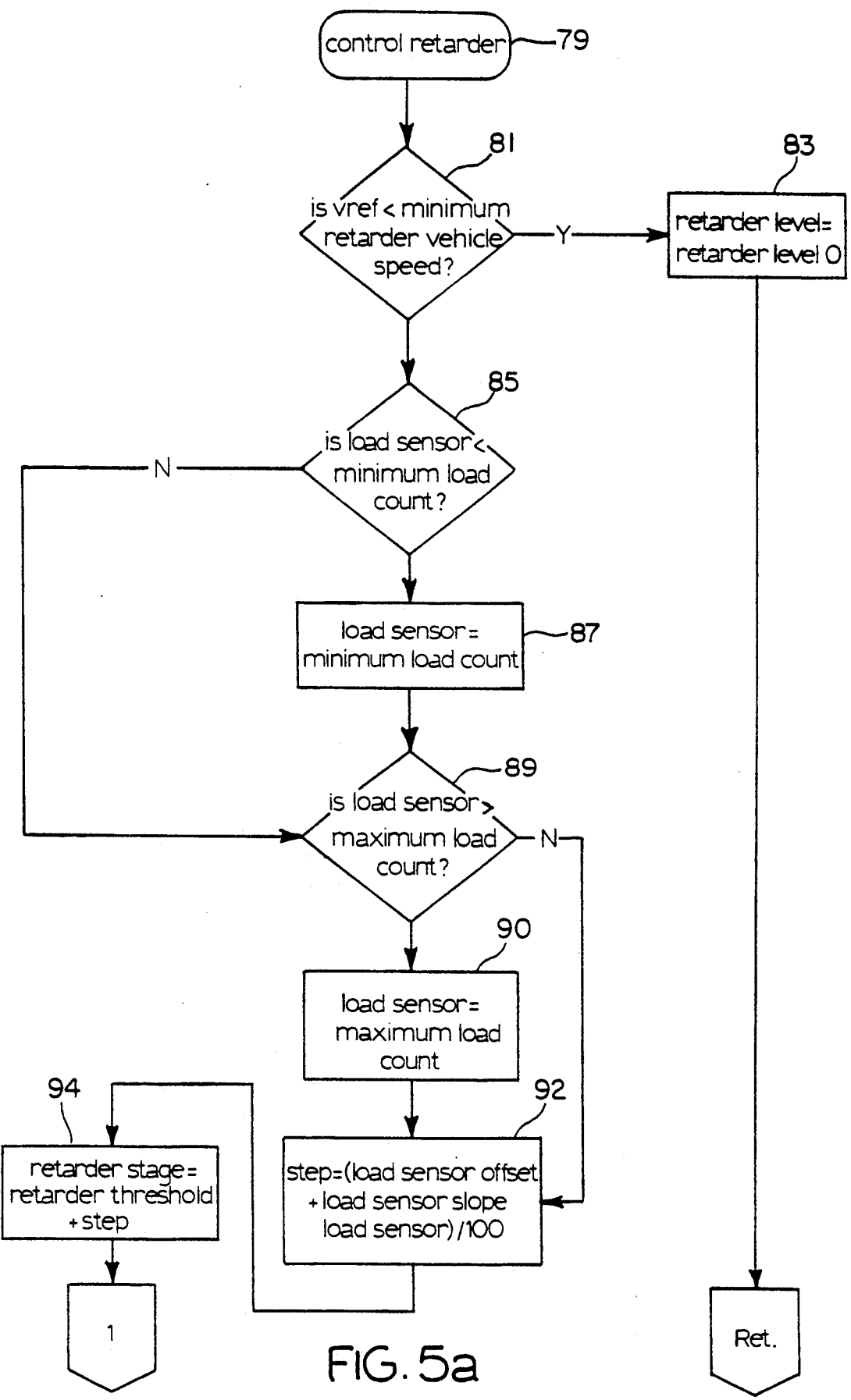
Figure 5B:
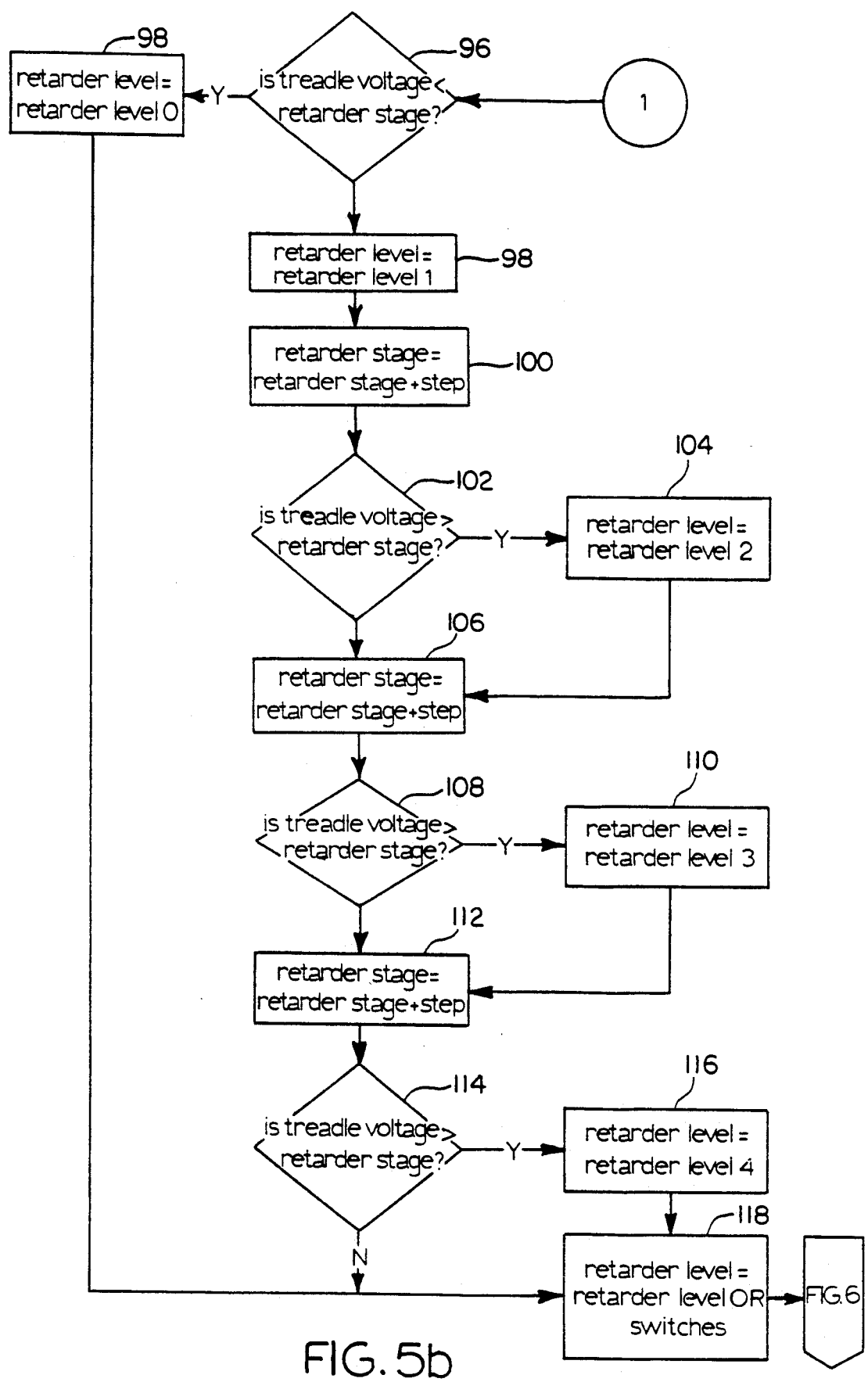

Referring now to FIG. 5b, the treadle voltage generated by operation of the brake treadle generator 18 is then compared with the retarder stage variable calculated at 94 in FIG. 5a. If the treadle voltage is less than the retarder stage, as indicated at 96, the retarder level, as indicated at 98, is set equal to zero. If the treadle voltage is greater than the retarder stage, the retarder stage is set to a preliminary level of one, as indicated at 98. The retarder stage is then recalculated as equal to the previous retarder stage plus the step calculated at 92 as indicated at 100. The result is then tested, as indicated at 102, to determine if the treadle voltage is greater than the retarder stage variable calculated at 100. If it is, the retarder level is set at retarder level two, as indicated at 104. The retarder stage variable is then recalculated, as indicated at 106, by again adding the step calculated at 92 to the previous value of the retarder stage variable. This result is tested, as indicated at 108, to determine if the treadle voltage is larger than the retarder stage variable. If it is, the retarder level is set at the retarder level three, as indicated at 110. As indicated at 12, the retarder stage variable is again recalculated by again adding the step variable calculated at 92 to the previous value of the retarder stage variable. The treadle voltage is again tested, as indicated at 114, to determine if it is greater than the retarder stage variable. If it is, the retarder stage is equal to the retarder level four, as indicated at 116. After setting the retarder level zero at 98, or after the program has proceeded through the other branch through the boxes 98–116, the retarder level determined by the foregoing calculation is compared with the retarder level set by the operator by manipulating the switches 26a–d, as indicated at 118. The program then proceeds to test for wheel lockup before sending the retarder program back to the main routine. This is done with reference to FIG. 6.

If the braking system is controlled by the adaptive braking subroutine, or if the wheels controlled by the retarder are about to lock up due to the effects of the retarder, it is not desirable to use the retarder to stop the vehicle. Instead, it is desirable to stop the vehicle by using the fluid pressure braking system, which is under control of the antiskid subroutine. Once the incipient skidding condition has passed, control can be retained until the vehicle operator releases the treadle 18, or retarder control can be reintroduced in timed stages.

Figure 6:
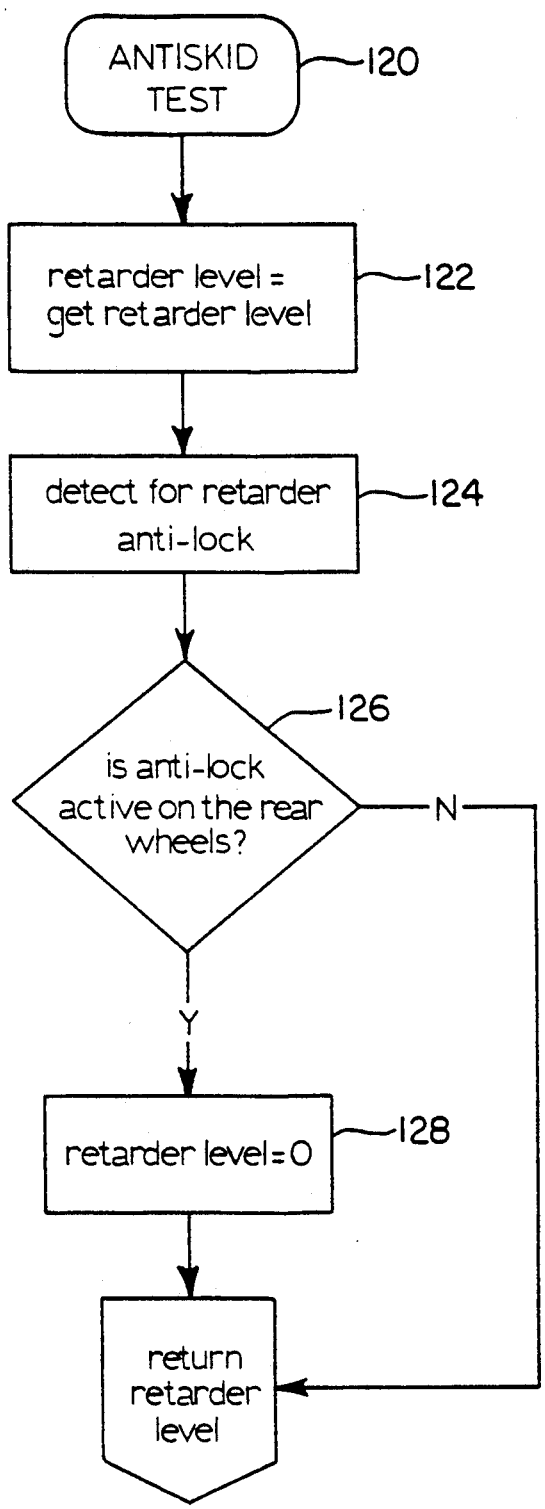

Referring to FIG. 6, the antiskid test indicated at 120 proceeds to obtain the retarder level calculated, as indicated at 122, from the subroutine illustrated in FIGS. 5a, 5b. The program then proceeds to 124, where it calls the subroutine illustrated in FIG. 7, to detect for retarder antiskid. The program then tests, as indicated at 126, to determine if antiskid is active on the rear wheels. If antiskid is active, the retarder level is set at zero, as indicated at 128.

Figure 7:
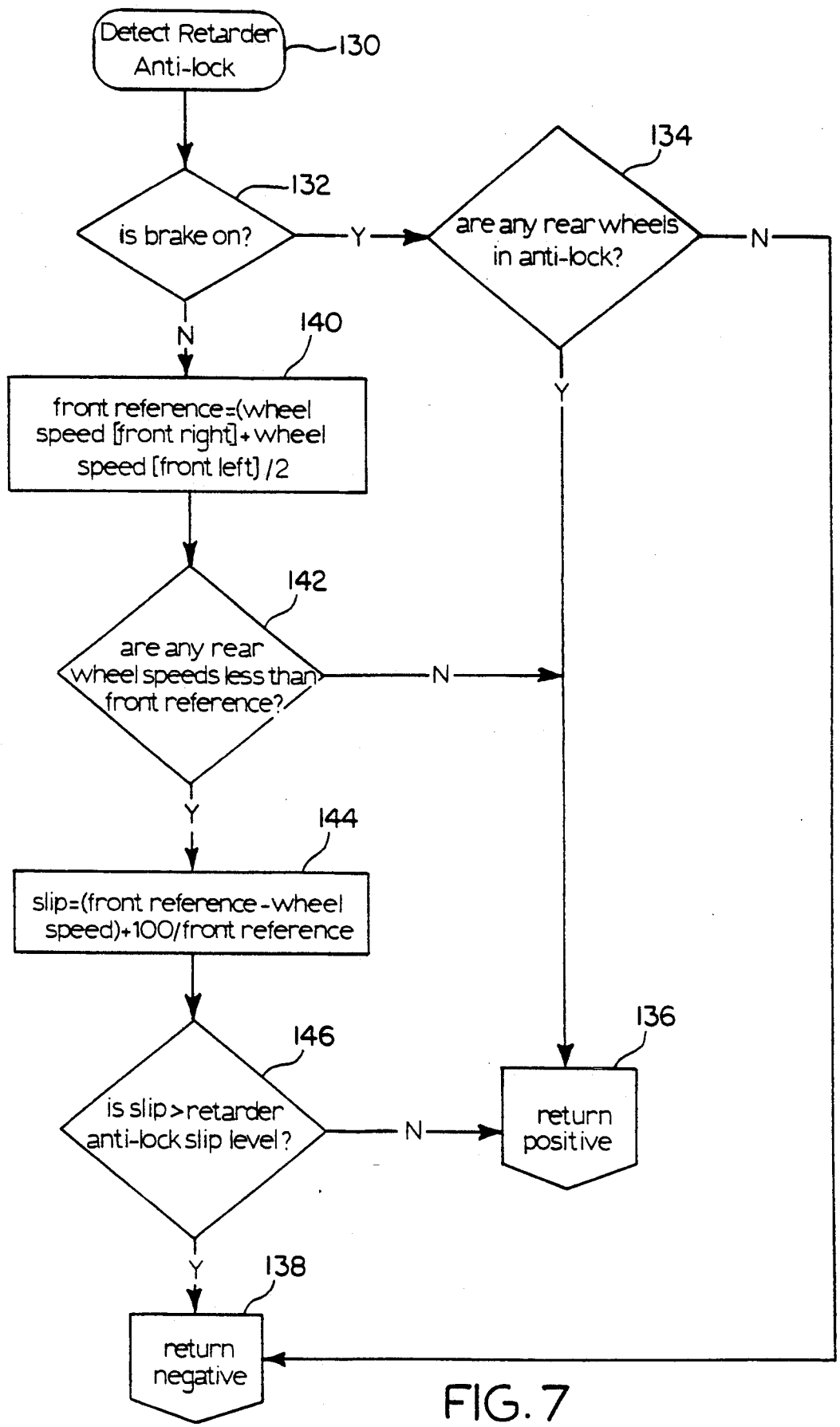

Referring to FIG. 7, the test for retarder antiskid is illustrated, beginning at 130. It is, of course, possible to be retarding the vehicle through applications of the switch 26a–d without the brake treadle signal generator 18 being activated. In that case, upon activation of the fluid pressure braking system, it is not desirable to set an additional retarder stage if an incipient skidding condition of the driven wheels exists. Accordingly, a test is made, as indicated at 132 to determine if the brake treadle signal generator 18 has been activated. If the treadle 18 has been activated, a test is made at 134 to determine if the aforementioned antiskid subroutine has been called to control braking many of the driven wheels. If any of the driven wheels are being controlled by the antiskid subroutine, the program returns to the program illustrated FIG. 6 as a positive for the test made at 126, so that retarder level will be set at zero. If the driven wheels are not in antiskid with the brake on, the return is negative for the test made at 126 in FIG. 6. If the brake is not on, a front reference velocity is calculated as indicated at 140 as equal to the average of the front wheel speeds. A test is then made, as indicated at 142, to determine if any of the rear wheel speeds are less than the front reference. If both rear or driven wheel speeds are greater than the front reference, the program returns positive. If any of the rear wheels are less than the front reference, a slip function is calculated, as indicated at 144, as equal to the difference between the front reference minus the speed of each rear wheel controlled by the controllers 36b and 36c times 100 divided by the front reference speed. As indicated at 146, the slip function is tested to determine if it is greater than a predetermined arbitrary retarder antiskid slip level. If it is, the return is negative as indicated at 138; if it is not, the return is positive as indicated at 136.

Accordingly, the retarder level returned to the main program through FIG. 6 will be zero if the brake treadle signal 18 has been activated and if either of the rear driven wheels are controlled by the antiskid subroutine, or if the brake signal generator is not actuated and the retarder has been applied and the rear wheels are about to lock up. The retarder level calculated by FIGS. 5, 6 and 7 is then used to actuate the retarder relays 30*a-d* depending upon which of the retarder levels has been selected by the vehicle operator by manipulating the switches 26*a-d* or has been calculated. The program calculates the braking pressure to be transmitted to the rear or driven wheel brake actuators, taking into account the retardation level provided by the retarder. This is done through the subroutine illustrated in FIG. 3.

Figure 8:
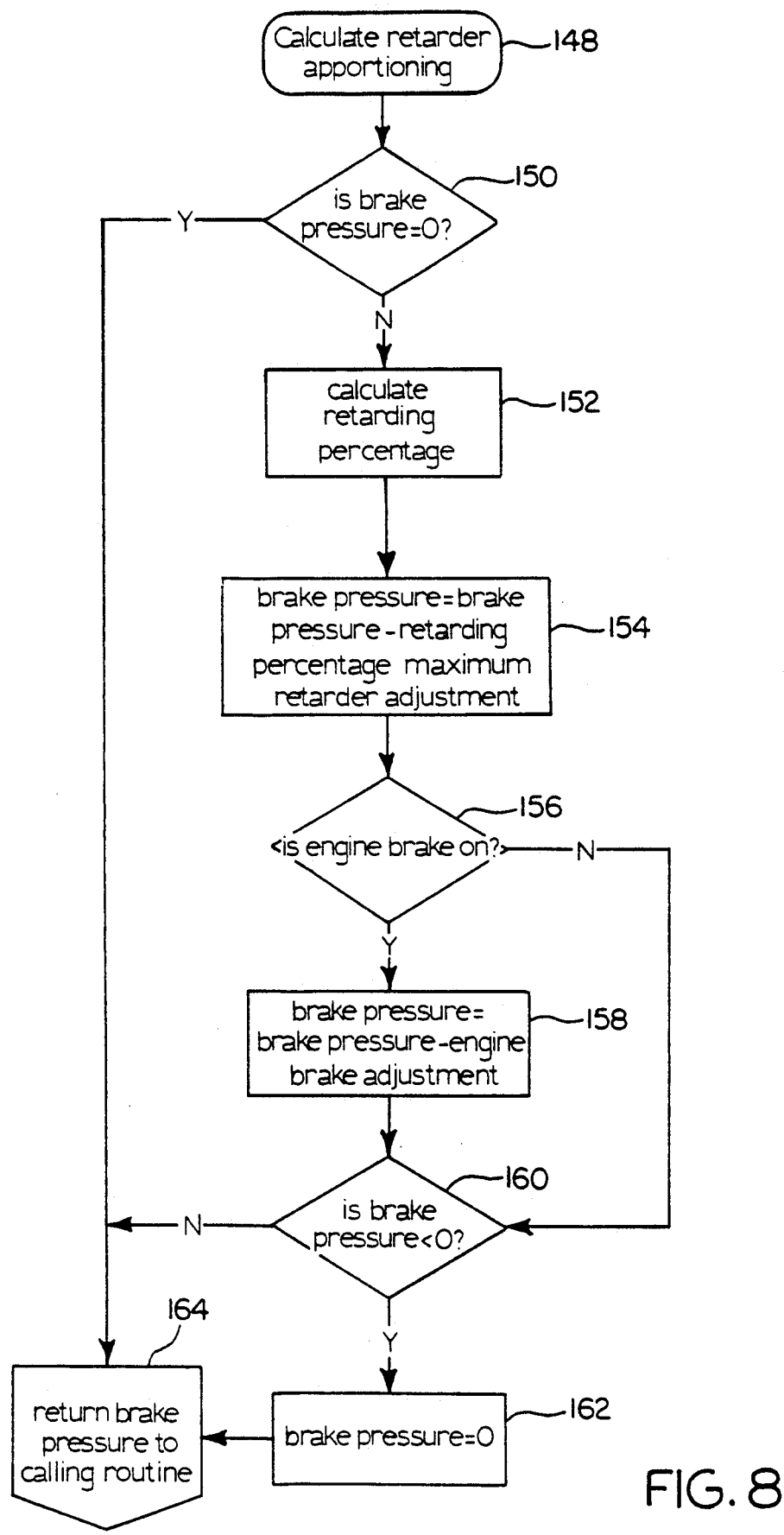

Referring now to FIG. 8, an alternate control subroutine for a vehicle equipped with a variable, instead of a staged, retarder is illustrated. A variable retarder is similar to a staged retarder, except that the retardation level may be varied continuously instead of requiring that a stage be selected. In this case, the retarder apportioning is calculated at indicated at 148, by first determining if the brake is applied, as indicated at 150. The retarding percentage is then calculated, as indicated at 152. The retarder percentage may be adjusted manually by the vehicle operator, by moving a continuously variable dial, or the retarding percentage may be calculated in much the same way as the upper stage of the stage retarder is calculated using the subroutines illustrated in FIGS. 5-7. The only difference is that the retardation is calculated as a direct function of vehicle load, instead of in step increments as illustrated in FIG. 5. Once the retarding percentage is determined, the brake pressure is calculated, as indicated at 154, as being equal to the brake pressure level demanded by the vehicle operator by operation of the signal generator 18, minus the retarding percentage times the maximum retarder adjustment. A test is made for the engine brake as indicated at 156; if the engine brake is on, a further adjustment is made for the engine brake as indicated at 158. A test is then made to determine if the brake pressure which should be sent to the fluid pressure actuators on the driven wheels is less than zero, as indicated at 160. If this brake pressure is less than zero, it is set equal to zero as at 162, but otherwise the brake pressure is returned to the calling routine as indicated at 164. The retarder percentage which is calculated as a function of vehicle load then is used to control a continuously variable actuator which controls the retarding percentage of the retarder, in a manner well known to those skilled in the art.

We claim:

1. Apparatus for controlling retardation of a vehicle having a settable vehicle retarder separate from a vehicle fluid pressure braking system, said braking system including a fluid pressure operated brake controlling a wheel of the vehicle controlled by said retarder comprising operator-actuated means for generating a braking request signal as a function of the braking level requested by the vehicle operator, modulating means for setting a brake pressure level in said brake as a function of a brake pressure control signal, said retarder being set by a retarder control signal, and a microprocessor receiving said request signal and generating said brake pressure control signal as a function of the difference between said braking request signal and said retarder control signal.

2. Apparatus for controlling retardation of a vehicle as claimed in claim 1, wherein said apparatus includes load sensing means for generating a loading signal which varies as a function of the load carried by the vehicle, said microprocessor receiving said loading signal and generating at least one of said control signals as a function of the loading signal.

3. Apparatus for controlling retardation of a vehicle as claimed in claim 2, wherein said one signal is the retarder control signal.

4. Apparatus for controlling retardation of a vehicle as claimed in claim 1, wherein said apparatus includes switch means for manually setting said retarder independently of said braking request signal for optional use by the vehicle operator, said microprocessor including means responsive to said switch means for generating said brake pressure control signal as a function of the switch means and the braking request signal.

5. Apparatus for controlling retardation of a vehicle as claimed in claim 1, wherein said apparatus includes speed sensing means determining vehicle speed, said microprocessor including means responsive to said vehicle speed for inhibiting said retarder control signal and causing the braking pressure established by said braking request signal to be communicated to said brakes when the vehicle speed drops below a predetermined level.

6. Apparatus for controlling retardation of a vehicle as claimed in claim 1, wherein said apparatus includes wheel speed sensing means, said microprocessor including means responsive to said wheel speed sensing means for establishing when an incipient skidding condition exists, said microprocessor further including means for inhibiting said retarder control signal and causing the braking pressure established by said braking request signal to be communicated to said brakes when an incipient skidding condition exists.

7. Apparatus for controlling retardation of a vehicle as claimed in claim 1, wherein said retarder is a staged retarder settable in one or more discreet stages, each of said stages providing a predetermined retardation of the vehicle.

8. Apparatus for controlling retardation of a vehicle as claimed in claim 1, wherein said retarder is a continuously variable retarder.

9. Method of controlling retardation of a vehicle having a fluid pressure braking system, said vehicle also having a settable vehicle retarder separate from said vehicle fluid pressure braking system, said braking system including fluid pressure operated brakes controlling the wheels of the vehicle also controlled by said retarder comprising the steps of generating a braking pressure request signal as a function of the braking level requested by the vehicle operator, generating a retarder setting signal representing the braking pressure equivalent of an established retarder setting, calculating a difference signal varying in accordance with the difference between the braking pressure request signal and the retarder setting signal, and generating a brake pressure level in the fluid pressure operated brakes as a function of said difference signal if said difference signal is greater than zero.

10. Method of controlling retardation of a vehicle having a fluid pressure braking system as claimed in claim 9, including the step of setting a retarder setting as a function of the braking pressure request signal.

11. Method of controlling retardation of a vehicle having a fluid pressure braking system as claimed in claim 10, wherein said retarder setting is set as a function of the load carried by the vehicle.

12. Method of controlling retardation of a vehicle having a fluid pressure braking system as claimed in claim 10, wherein said retarder setting is established as a function of vehicle load, comparing said retarder setting signal with said braking pressure request signal, and setting said retarder at a level providing a vehicle retardation equal to or less than the equivalent retardation provided by the braking pressure corresponding to the braking pressure request signal.

13. Method of controlling retardation of a vehicle having a fluid pressure braking system as claimed in claim 12, wherein said retarder is a staged retarder settable in one or more discreet stages, each of said stages providing a predetermined retardation of the vehicle, said step of setting the level of the retarder including the step of setting the retarder at a stage providing a retardation closest to, but less than, the braking pressure level established by the braking pressure request signal.

14. Method of controlling retardation of a vehicle having a fluid pressure braking system as claimed in claim 12, wherein said retarder is a continuously variable retarder and the step of setting the level of the retarder includes the step of setting the retarder as a function of the braking pressure request signal and vehicle load until a maximum retardation level of the retarder is set, said difference signal being generated only after additional retardation is required after the maximum retardation level of the retarder has been set.

15. Method of controlling retardation of a vehicle having a fluid pressure braking system as claimed in claim 12, wherein said retarder is set at a zero retardation level and said difference signal is generated solely as a function of the braking pressure request signal if the speed of the vehicle is below a predetermined threshold speed.

16. Method of controlling retardation of a vehicle having a fluid pressure braking system as claimed in claim 12, including the step of determining an incipient skidding condition of one or more of the vehicle wheels controlled by said retarder, and setting a zero retardation level of said retarder when said incipient skidding condition exist upon generation of the braking pressure request signal whereupon said difference signal is generated solely as a function of said braking pressure request signal.

17. Method of controlling retardation of a vehicle having a fluid pressure braking system as claimed in claim 16, wherein said incipient skidding condition is determined for a wheel of the vehicle controlled by said retarder by comparing the wheel speeds of the wheels controlled by the retarder with the wheel speeds of the wheels of the vehicle not controlled by said retarder.

18. Method of controlling retardation of a vehicle having a fluid pressure braking system as claimed in claim 12, including means for manually setting the retardation level of the retarder, said difference signal being set as a function of the manually set retardation level instead of the retarder setting signal when the retardation level of the retarder has been manually set.

* * * * *